(12) United States Patent
Jasra et al.

(10) Patent No.: US 10,479,876 B2
(45) Date of Patent: Nov. 19, 2019

(54) SULPHUR CONTAINING ADDITIVE FOR MAKING BITUMEN PAVING MIXTURES

(71) Applicant: Reliance Industries Limited, Mumbai (IN)

(72) Inventors: Raksh Vir Jasra, Vadodara (IN); Nagarathinam Shenbaga Murthy, Tuticorin (IN); Mayur Navinchandra Talati, Rajkot (IN); Lintoan John, Kottayam (IN); Srinivasarao Pothuru, Guntur (IN); Satish Kumar, Gohana (IN); Kalpeshkumar Bhikhubhai Sidhpuria, Surat (IN); Yogesh Suresh Niwate, Bhayander (IN); Prakash Kumar, Vadodara (IN); Kalpana Gopalakrishnan, Vadodara (IN); Vijayalakshmi Ravi Puranik, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 15/560,725

(22) PCT Filed: Mar. 22, 2016

(86) PCT No.: PCT/IB2016/051596
§ 371 (c)(1),
(2) Date: Sep. 22, 2017

(87) PCT Pub. No.: WO2016/151480
PCT Pub. Date: Sep. 29, 2016

(65) Prior Publication Data
US 2018/0072864 A1    Mar. 15, 2018

(30) Foreign Application Priority Data

Mar. 25, 2015 (IN) .......................... 999/MUM/2015

(51) Int. Cl.
| C08K 3/06 | (2006.01) |
| C08K 3/22 | (2006.01) |
| C08K 3/30 | (2006.01) |
| C08L 95/00 | (2006.01) |
| C04B 26/26 | (2006.01) |
| C08K 3/34 | (2006.01) |
| C08K 3/36 | (2006.01) |

(52) U.S. Cl.
CPC .............. *C08K 3/06* (2013.01); *C04B 26/26* (2013.01); *C08K 3/22* (2013.01); *C08K 3/30* (2013.01); *C08K 3/34* (2013.01); *C08K 3/36* (2013.01); *C08L 95/00* (2013.01); *C08K 2003/2206* (2013.01); *C08K 2003/2227* (2013.01); *C08K 2003/2272* (2013.01); *C08K 2003/3045* (2013.01); *C08K 2201/014* (2013.01)

(58) Field of Classification Search
CPC ... C08K 3/06; C08K 3/22; C08K 3/30; C08K 3/34; C08K 3/36; C08K 2003/2206; C08K 2003/2217; C08K 2003/3045; C08K 2003/3063; C08K 2003/3072; C08K 2003/3081; C08K 2201/014; C04B 26/26; C08L 95/00; C01B 17/00; E01C 7/00; E01C 19/00
See application file for complete search history.

(56) References Cited

U.S. PATENT DOCUMENTS

| 4,956,160 | A * | 9/1990 | Reichert | B01D 53/52 210/749 |
| 5,948,269 | A * | 9/1999 | Stone | C02F 1/5245 210/718 |
| 7,226,501 | B2 * | 6/2007 | Thorstensson | C08K 5/5205 106/277 |
| 8,025,724 | B2 * | 9/2011 | Deme | C01B 17/00 106/273.1 |
| 2008/0072798 | A1 * | 3/2008 | Garcia Luna | C04B 26/26 106/735 |
| 2013/0008348 | A1 * | 1/2013 | Sockwell | C04B 26/26 106/668 |
| 2013/0336720 | A1 * | 12/2013 | Jack | C08L 95/00 404/75 |

FOREIGN PATENT DOCUMENTS

| GB | 1494198 A | 12/1977 |
| GB | 2058041 A | 4/1981 |
| GB | 2058041 B | 5/1983 |
| GB | 2137633 A | 10/1984 |
| WO | 03/070368 A1 | 8/2003 |

OTHER PUBLICATIONS

"Mineral and oxide composition of portland cement". (Year: 2010).*
International Search Report issued in PCT/IB2016/051596 dated Jun. 27, 2016 (2 pages).
Written Opinion of the International Searching Authority issued in PCT/IB2016/051596 dated Jun. 27, 2016 (4 pages).

* cited by examiner

*Primary Examiner* — Alexandra M Moore
(74) *Attorney, Agent, or Firm* — Osha Liang LLP

(57) ABSTRACT

The present disclosure relates to a sulphur containing additive for bitumen paving mixtures. The sulphur containing additive comprises sulphur, a mixture of metal oxides, and optionally 5 at least one metal sulphate. The mixture of metal oxides includes calcium oxide, silicon dioxide, aluminum oxide and ferric oxide.

7 Claims, No Drawings

SULPHUR CONTAINING ADDITIVE FOR MAKING BITUMEN PAVING MIXTURES

FIELD

The present disclosure relates to a sulphur containing additive for bitumen paving mixture and the method of preparation for the same.

Definitions

As used in the present disclosure, the following terms are generally intended to have the meaning as set forth below, except to the extent that the context in which they are used indicate otherwise.

OSHA (Occupational Safety and Health Administration) standards: OSHA determines the permissible level of $H_2S$ in the surrounding which is non-hazardous to human being. As per OSHA standards, $H_2S$ emission up to 20 ppm can be considered non-hazardous.

Multi-gas detector is used for the detection of $H_2S$ having detection sensitivity ranging between 1 ppm to 100 ppm (Resolution: 0.1 ppm).

BACKGROUND

Viscosity grade bitumen is used to coat aggregate material for the construction and/or pavement of roads. Sulphur is mixed with bitumen to enhance properties of bitumen viz. mechanical strength, corrosion resistance, water resistance, marshal stability, fatigue, resilient modulus (MR) and the like. However, use of sulphur in bitumen for making bitumen paving mixtures is restricted due to the emission of hydrogen sulphide gas during use of sulphur extended bitumen in paving mixture preparation, its transportation or laying on the road.

$H_2S$ released while mixing sulphur with bitumen comes from several sources. The chemistry of generation of $H_2S$ is a reaction that occurs between bitumen and sulphur at temperatures greater than 120° C. Sulphur has condensing effect upon asphalt under heat resulting in the formation of gaseous hydrogen sulphide as per below given reaction:

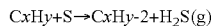

$$CxHy+S \rightarrow CxHy\text{-}2+H_2S(g)$$

at temperature greater than 120° C., cracking of sulphur organic compounds is also responsible for liberation of $H_2S$. $H_2S$ emission is hazardous as it directly affects the human nervous system, and therefore, it is necessary to minimize $H_2S$ emission in the aforestated process.

Occupational safety and health administration (OSHA) has established a permissible exposure limit (8 hour time-weighted average of 10 ppm and acceptable ceiling concentration of 20 ppm.)

There is, therefore, felt a need to minimize the emission of hazardous $H_2S$ gas during paving mixture preparation.

OBJECTS

Some of the objects of the present disclosure, which at least one embodiment herein satisfies, are as follows:

An object of the present disclosure is to provide a sulphur containing additive for producing bitumen paving mixture having significant $H_2S$ suppressant ability.

Another object of the present disclosure is to reduce the emission of $H_2S$ gas below permissible limit during preparation, transportation and application of bitumen paving mixture.

Still another object of the present disclosure is to provide a simple, economic and safe process for the preparation of sulphur containing additive.

Other objects and advantages of the present disclosure will be more apparent from the following description, which is not intended to limit the scope of the present disclosure.

SUMMARY

The present disclosure provides a sulphur containing additive for making bitumen paving mixtures. The sulphur containing additive comprises of sulphur, a mixture of metal oxides and optionally at least one metal sulphate; said sulphur containing additive comprising:
  sulphur in an amount ranging from 85 weight % to 98 weight %;
  a mixture of metal oxides in an amount ranging from 2 weight % to 15 weight %;
  at least one metal sulphate in an amount ranging from 0 to 10 weight %.

In accordance with one of embodiments of the present disclosure, the metal sulphate used along with mixture of metal oxides is calcium sulphate.
  wherein the mixture of metal oxides comprising calcium oxide, silicon dioxide, aluminum oxide and ferric oxide.
  The composition of said mixture of metal oxides includes:
  a) calcium oxide in an amount ranging from 50 weight % to 70 weight %;
  b) silicon dioxide in an amount ranging from 10 weight % to 30 weight %;
  c) aluminum oxide in an amount ranging from 1 weight % to 10 weight %; and
  d) ferric oxide in an amount ranging from 1 weight % to 10 weight %.

Present invention also discloses the process for the preparation of the sulphur containing additive and its subsequent use in the bitumen paving mixture.

The sulphur containing additive of the present disclosure reduces the emission of hydrogen sulphide ($H_2S$) gas below permissible level during the preparation of bitumen paving mixture, its transportation and laying on the road.

DETAILED DESCRIPTION

The present disclosure provides a sulphur containing additive for reducing the emission of hydrogen sulphide ($H_2S$) gas during the preparation, transportation and use of sulphur extended bitumen paving mixtures.

In accordance with one aspect of the present disclosure there is provided a sulphur containing additive for the preparation of bitumen paving mixtures, the sulphur containing additive comprises:
  sulphur;
  a mixture of metal oxides; and
  optionally, at least one metal sulphate.

The composition of the sulphur containing additive comprise of various proportion of sulphur, a mixture of metal oxides and optionally at least one metal sulphate.

Sulphur content in the sulphur containing additive is in the range of 85 weight % to 98 weight %.

The combined amount of the mixture of metal oxides and metal sulphate in the sulphur containing additive is in the range from 2 weight % to 15 weight %, preferably 7 weight % to 10 weight %.

The amount of at least one metal sulphate in the sulphur containing additive is less than 10 weight %.

In accordance with one embodiment of the present disclosure, the metal sulphate is calcium sulphate.

The composition of the mixture of metal oxides is as follows:
- calcium oxide in an amount ranging from 50 to 70 weight %;
- silicon dioxide in an amount ranging from 10 to 30 weight %;
- aluminum oxide in an amount ranging from 1 to 10 weight %; and
- ferric oxide in an amount ranging from 1 to 10 weight %.

In accordance with another aspect of the present disclosure, there is provided a process for the preparation of the sulphur containing additive, the process comprising the following steps:
- sulphur is introduced to the reactor and melted at a temperature up to 160° C. to obtain molten sulphur
- a mixture of metal oxides, and optionally a metal sulphate, are added in the reactor to obtain a blend;
- the blend is melted and stirred at a temperature up to 160° C. to obtain a molten blend; and
- the molten blend is cooled to obtain the sulphur containing additive.

The blend is molded into a solid article having at least one of the shapes selected from the group consisting of pastilles, flakes, extrudates and granules.

In accordance with one embodiment of the present disclosure, sulphur, introduced into the reactor, is raw sulphur.

In yet another embodiment, sulphur can be molten after addition and homogeneous mixing of metal oxide and metal sulphate in powder form, to obtain melted slurry which is further cooled to obtain sulphur containing additive.

In accordance with still another aspect of the present disclosure, there is provided a process for the preparation of bitumen paving mixture, wherein bitumen is crushed into pieces of desired size and heated to obtain molten bitumen. Thereafter, the molten bitumen and the sulphur containing additive are mixed to obtain the bitumen paving mixture.

It has been found that certain combinations of mixing agitator speed and temperature are more effective in suppressing $H_2S$ generation while preparing bitumen paving mixture having minimum 30 wt % of sulphur containing additive. Preferred mixing speed of sulphur containing additive with bitumen, is in the range of 20 to 100 rpm, preferably in the range of 30 to 70 rpm. The mixing temperature is in the range of 80 to 180° C., preferably in the range of 120 to 135° C. The bitumen paving mixture from this composition can be applied in places having extreme weather conditions of temperature (−10 to 70° C.).

The sulphur containing additive when mixed with bitumen, enhances the binding property of the bitumen due to which the quality of roads in terms of marshal stability, mechanical strength, corrosion resistance, water resistance, fatigue resistance, resilient modulus (MR) and the like is improved.

In accordance with one embodiment of the present disclosure, the preparation of the bitumen paving mixture comprises mixing the sulphur containing additive to bitumen at a temperature in the range of 80 to 180° C., more preferably in the range of 120 to 135° C. and at a mixing speed ranging from 20 rpm to 100 rpm, more preferably from 30 rpm to 70 rpm.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

Experiment 1: Preparation of the Mixture of Metal Oxides

A mixture of metal oxides is prepared by mixing together 3.25 g CaO, 1.0 g $SiO_2$, 0.25 g $Al_2O_3$ and 0.25 g $Fe_2O_3$.

Experiment 2: Preparation of Sulphur Containing Additive

A beaker was charged with a 60 g of crushed sulphur pellets or sulphur powder. Sulphur was heated at 150° C. to obtain molten sulphur. 5 g mixture of metal oxides (of Exp. 1) and metal sulphate (ratio of mixture of metal oxide to metal sulphate was 19) was added to molten sulphur under constant stirring to obtain a homogeneous slurry. The homogeneous slurry was cooled and molded into granules to obtain the sulphur containing additive.

Experiment-3: Effect of Addition of the Sulphur Containing Additive in Bitumen on $H_2S$ Emission A beaker was charged with 140 g of bitumen. The bitumen was heated at a temperature of 180° C. to obtain the heated bitumen. 60 g of the sulphur containing additive (as obtained in Exp. 2) was added to the heated bitumen under continuous stirring with the stirring speed of 50 rpm to obtain the bitumen paving mixture. $H_2S$ emission was observed at zero inch level of beaker brim using a multi-gas detector in the temperature range of 100 to 180° C.

Table-1 illustrates the effect of addition of the sulphur containing additive in bitumen on $H_2S$ emission.

TABLE 1

| | Effect of addition of the sulphur containing additive in bitumen on $H_2S$ emission | | | | |
|---|---|---|---|---|---|
| Test | Sulphur containing additive (weight %) | Sulphur (weight %) | Bitumen (weight %) | Temperature (° C.) | $H_2S$ emission (ppm) |
| 1 | 0 | 30 | 70 | 140 | 200 |
| 2 | 30 | 0 | 70 | 100 | undetectable |
| 3 | 30 | 0 | 70 | 120 | <2 |
| 4 | 30 | 0 | 70 | 140 | <2 |
| 5 | 30 | 0 | 70 | 160 | >6 |
| 6 | 30 | 0 | 70 | 180 | >10 |

As shown in Table 1, Test 1 was performed for the comparative purpose, wherein no sulphur containing additive was added. It is observed that on addition of sulphur in bitumen paving mixture at 140° C. resulted in emission of 200 ppm of hydrogen sulphide ($H_2S$) gas. However, tests 2 to 6 showed that the emission $H_2S$ was reduced after the addition of sulphur containing additive of the present disclosure in bitumen paving mixture.

Experiment 4: Effect of Addition of the Sulphur Containing Additive in Bitumen on $H_2S$ Emission The bitumen paving mixture prepared in Experiment 3 was cooled down overnight to room temperature to obtain a solid mass. The solid mass was cut into pieces and heated up to 100° C. $H_2S$ emission was checked at different levels using a multi-gas detector. Table-2 illustrates the effect of addition of the sulphur containing additive in bitumen on $H_2S$ emission.

TABLE 2

Effect of addition of the sulphur containing additive in bitumen on $H_2S$ emission

| Bitumen paving mixture (weight %) | Temperature (° C.) | $H_2S$ emission (ppm) |
|---|---|---|
| 100 | 40 | undetectable |
| 100 | 60 | undetectable |
| 100 | 80 | undetectable |
| 100 | 100 | <2 |

Table-2 clearly reveals that, sulphur containing additive of the present disclosure in bitumen paving mixture results in reduction in the emission of hydrogen sulphide gas. Heating the solid mass of bitumen paving mixture at a temperature in the range of 40 to 100° C., shows undetectable $H_2S$ emission or less than 2 ppm of $H_2S$ emission.

Experiment 5: Effect of Addition of Different Additive in Bitumen on $H_2S$ Emission Experiments have been performed using various metal oxides/sulfates as an additive for $H_2S$ scavenging, while preparing sulfur extended bitumen paving mixture. The results are summarized in table given below:

| Bitumen Qty (g) | Sulfur Qty (g) | Additive | Additive Qty (g) | $H_2S$ emission ppm | Temperature ° C. |
|---|---|---|---|---|---|
| 70 | 30 | ZnO | 2 | 60 | 120 |
| 70 | 30 | NiS | 1 | 120 | 120 |
| 70 | 28 | Coke | 2 | 100 | 120 |
| 70 | 30 | Calcium carbonate | 2.5 | 10 | 120 |

Use of sulphur containing additive of the present disclosure shows promising results in $H_2S$ scavenging (as shown in table-1), during the preparation of sulfur extended bitumen paving mixture. However, the use of ZnO, NiS and Coke were found to be ineffective for $H_2S$ emission.

Technical Advancements

The present disclosure described herein above has several technical advantages including, but not limited to, the realization of:

a sulphur containing additive that reduces/suppresses $H_2S$ emission during the preparation of bitumen paving mixture; and a process for the preparation of the sulphur containing additive that is economically viable.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A sulphur containing additive for bitumen paving mixtures, said sulphur containing additive comprising:
   a. sulphur;
   b. a mixture of metal oxides; and
   c. optionally, at least one metal sulphate,
   wherein said mixture of metal oxides comprises calcium oxide in an amount in the range of 50 weight % to 60 weight %, silicon dioxide in an amount in the range of 25 weight % to 30 weight %, aluminium oxide in an amount in the range of 1 weight % to 2 weight %, and ferric oxide in an amount in the range of 8 weight % to 10 weight %.

2. The sulphur containing additive as claimed in claim 1, wherein
   a. said sulphur is in an amount in the range of 85 to 98 weight % of said sulphur containing additive;
   b. said mixture of metal oxides is in an amount in the range of 2 to 15 weight % of said sulphur containing additive; and
   c. said at least one metal sulphate is in an amount ranging from 0 to 10 weight % of said sulphur containing additive.

3. The sulphur containing additive as claimed in claim 1, wherein said metal sulphate is calcium sulphate.

4. The sulphur containing additive as claimed in claim 1, wherein said sulphur containing additive is molded into at least one solid article shape selected from the group consisting of pastilles, flakes, extrudates and granules.

5. A process for preparing said sulphur containing additive as claimed in claim 1 for said bitumen paving mixture, said process comprising the following steps:
   a. melting said sulphur at a temperature up to 160° C. in a reactor to obtain molten sulphur;
   b. adding said mixture of metal oxides, optionally said metal sulphate to said molten sulphur to obtain a blend;
   c. melting and stirring said blend at a temperature up to 160° C. to obtain a molten blend; and
   d. cooling said molten blend to obtain said sulphur containing additive.

6. A process for preparing the sulphur containing additive as claimed in claim 1 for said bitumen paving mixture, said process comprising the following steps:
   a. mixing said mixture of metal oxides and optionally said metal sulphate with sulphur to obtain a blend;

b. melting and stirring said blend at a temperature up to 160° C. to obtain a molten blend; and
c. cooling said molten blend to obtain said sulphur containing additive.

7. A process for preparing a bitumen paving mixture, said process comprising mixing said sulphur containing additive of claim 1 to bitumen at a temperature in the range of 80 to 180° C. and stirring at a speed ranging from 20 to 100 rpm.

* * * * *